United States Patent [19]

Haas et al.

[11] 4,073,511
[45] Feb. 14, 1978

[54] COUPLING ASSEMBLY FOR SUBMARINE CASING SECTIONS

[76] Inventors: Billie G. Haas; Carol B. Haas, both of 3232 S. Madole, Oklahoma City, Okla. 73159

[21] Appl. No.: 707,830

[22] Filed: July 22, 1976

[51] Int. Cl.² ............................................. F16L 35/02
[52] U.S. Cl. ........................................ 285/3; 285/39; 285/321; 285/369
[58] Field of Search ...................... 285/3, 4, 18, 39, 86, 285/91, 321, 369

[56] References Cited

U.S. PATENT DOCUMENTS

| | | | |
|---|---|---|---|
| 2,778,433 | 1/1957 | Brown | 285/86 X |
| 3,321,217 | 5/1967 | Ahlstone | 285/86 X |
| 3,727,948 | 4/1973 | Current | 285/3 |
| 3,926,457 | 12/1975 | Williams et al. | 285/39 |

*Primary Examiner*—Dave W. Arola
*Attorney, Agent, or Firm*—William R. Laney

[57] ABSTRACT

This invention relates to a coupling assembly by which sections of well casing disposed beneath the floor of the sea or ocean can be detached from each other at a time when a well is to be cemented in, and it is desired to remove the wellhead structure and the sections of casing extending thereabove to a drilling platform. The coupling assembly comprises an upper casing section, a lower casing section, and an external coupling sleeve slidably telescoped over the lower end of the upper casing section and the upper end of the lower casing section. An internal collar is slidably positioned within the external sleeve at a location between the casing sections, and includes an annular ring projecting over and around an end portion of the lower casing section within the external coupling sleeve. An expandable locking element is positioned between said annular ring and the upper end portion of the lower casing section. The annular ring and the expandable locking element bear against an internal shoulder formed in the external coupling sleeve, and function to interlock the external coupling sleeve to the lower casing section. A frangible retaining element extends between and interengages the internal collar to the external coupling sleeve when the annular ring and expandable locking element are in their interlocking status, and is severable to permit the internal collar to be moved axially within the external coupling sleeve to facilitate disengagement of the coupling sleeve from the lower casing section.

10 Claims, 3 Drawing Figures

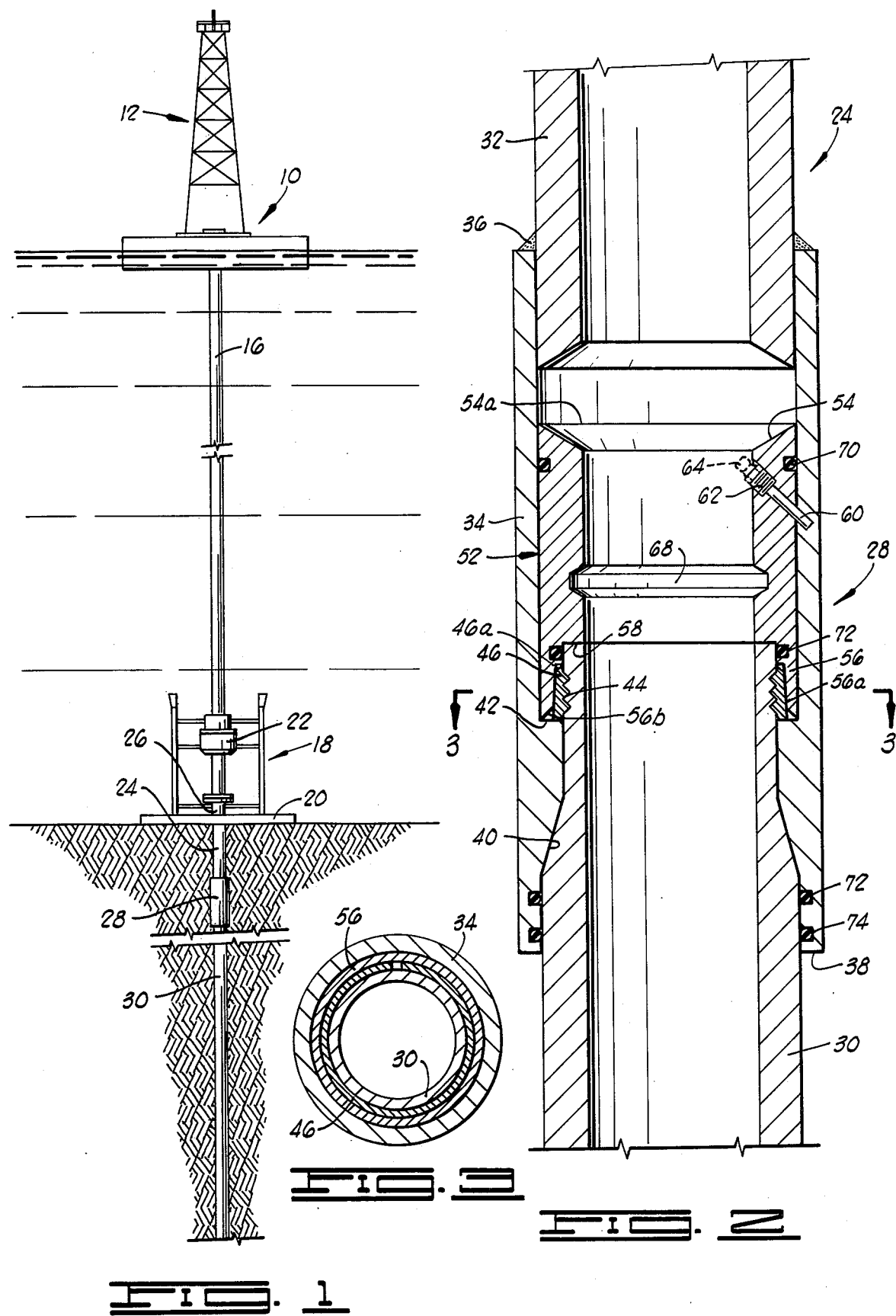

COUPLING ASSEMBLY FOR SUBMARINE CASING SECTIONS

BACKGROUND OF THE INVENTION

1. Field of the Invention

This invention relates to coupling devices adapted for use in submarine oil and gas wells, and particularly, for detachably interconnecting sections of casing at a location below the floor of the sea or ocean.

2. Brief Description of the Prior Art

It has been generally recognized in the technology of oil and gas exploration and production, that in some contexts, it is desirable to provide a safety coupling or a releasable joint which can be used for selectively disconnecting the upper portion of a tubing or casing string from a lower portion thereof. Often, in off-shore completions, it is desirable to remove the well head and sections of casing thereabove from the sections of casing below the well head, and particularly below the ocean floor, in order to cement in the well and leave the sea floor clean at the situs of the closed in well after operations are completed.

In general, it is recognized that couplings or joints which are severable or disengagable by actuation from the surface afford advantage where the disengagement can be effected without imparting a rotary motion to the actuating mechanisms within the joint or coupling. Rather, it is preferred to be able to effect the disconnection by an axial, up or down movement, or by application of a force without the requirement for such rotary motion.

A number of different types of safety joints or detachable couplings have previously been proposed, and in many instances include movable collars or sleeves temporarily secured in position by a shear pin, and used in conjunction with other structural elements or mechanisms for effecting firm coupling and engagement between casing sections during the operative employment of the casing sections for transmitting fluids between the bottom of the well bore and the surface, but actuatable at a time when it may be desired, for one reason or another, to detach the upper section of the casing from the lower section, and remove it from the well bore. The various structures which have been provided for accomplishing the prescribed functions have been numerous, and operate on different principles. Frequently the mechanisms which must be actuated and function properly, in order to allow safe, rapid and economical severance or disconnection of the casing sections to be effected, are complicated and, because of such complexity, are characterized in having a relatively high susceptibility to failure or malfunction. Also, many of the types of coupling structures provided for the described purpose have not afforded protection of the moving elements from contact with fluids flowing internally in the casing or tubing string, or from contact with deleterious external fluids, such as percolating sea water or the like.

Other problems, or lack of optimization, have been characteristic of many of the various other types of couplings utilized for interconnecting, on a temporary basis, vertically aligned casing sections. In some instances, such as the mechanism shown in British Pat. No. 999,838, actuation of the coupling mechanism to effect disconnection must be brought about by the use of hydraulic pressure developed form the surface to actuate a piston which moves to effect the disengaging action. In other types of joints or couplings previously proposed, a portion of the actuating mechanism is left in the well upon disconnection of the casing sections, thus presenting an economic loss, and the necessity to reconstitute or re-make up the safety joint structure if any attempt is made to subsequently use it in another well installation. Examples of prior art devices which leave portions of the operating mechanism in the well with the lower portion of the severed casing are described in Brown U.S. Pat. No. 3,288,493; Arterbury et al U.S. Pat. No. 2,843,399 and Schwabb U.S. Pat. No. 3,148,894. The same is true of the mechanism as shown in Ware U.S. Pat. No. 2,532,686. The previously mentioned disadvantage of exposure of operating or moving parts of the disconnection mechanism to well fluids moving within the bore through the casing, or to external fluids, such as sea water, outside the casing, is also characteristic of the Schwabb and Brown Patents. Such exposure is also characteristic of the coupling disconnecting mechanism shown in Clark U.S. Pat. No. 2,988,145.

It is also often a disadvantage of the disconnect mechanisms employed in severable joints or couplings of the type described that an initially downwardly acting force must be developed on the mechanism prior to the lifting or pulling out of the upper casing section following the disconnection of the coupling. In other words, two opposite acting forces developed at different times must be provided in order to effect the disconnection and removal of the upper casing section. This type of dual action is characteristic of the structures described in the Brown and Schwabb Patents.

In general, although the types of coupling safety joint structures provided for temporarily and operatively engaging axially aligned upper and lower casing or tubing sections have been operational and functioned properly and effectively upon the first usage, and if manipulated by skilled operators, none of the devices known to the prior art have been characterized by optimum simplicity of structure, and a high degree of reliability in use over long and extended periods.

BRIEF DESCRIPTION OF THE PRESENT INVENTION

The present invention comprises a coupling system which can be utilized to interlock casing sections to each other at a location beneath the floor of the ocean in an offshore oil or gas well completion, and to facilitate fluid-tight communication between the casing sections thus coupled. The coupling assembly can subsequently be easily actuated to disengage the upper casing section from the lower casing section coupled thereto by the coupling assembly to facilitate complete removal of the upper casing section, with concomitant wellhead structure, to leave the ocean floor completely clean and unlittered following such removal.

Broadly described, the coupling assembly of the invention, in its most basic form, comprises an external coupling sleeve diametrically dimensioned and adapted for telescoping engagement with a casing section thereabove, and slidably enclosing an internal collar having an annular locking ring at its lower end. The locking ring rests upon an axially facing, radially extending shoulder formed intermediate to the length of the coupling sleeve.

The internal collar is keyed to the coupling sleeve by a frangible element to temporarily prevent relative sliding movement between the collar and sleeve. The annular locking ring of the collar compressibly confines at least one expandable locking element which is adapted for radial engagement and interlocking with a serrated or notched tubular section located at the upper end of a lower casing section to be coupled by the coupling assembly to the upper casing section. Means is provided in the internal collar to facilitate engagement with a tool extended from the surface of the well to permit an upward force to be exerted on the collar sufficient to shear the shearable member, and permit axial movement of the collar within the coupling sleeve when disengagement of the casing sections is desired.

The present invention presents a marked advantage over detachable or severable casing section coupling assemblies previously proposed in its simplicity and reliability in repeated usage.

It is also an object of the invention to provide a coupling assembly which is inexpensive in construction, and which facilitates and permits the maximum recovery of all operative parts thereof at a time when the coupling is actuated to permit separation and removal of an upper casing section from a lower casing section.

A further object of the invention is to provide a coupling assembly in which the primary movable parts employed for effecting engagement between spaced, directly aligned casing sections is protected from exposure to either internal or external fluids passing through, or located outside of, the aligned bores in the casing sections coupled through the coupling assembly.

Another object of the invention is to provide a coupling assembly suitable for detachably coupling spaced oil well casing sections, in which coupling assembly, one of the primary moving elements is constructed to facilitate dual alternate use of a single aperture formed therethrough as a shear pin recess, and as a lubrication passageway.

Another object of the invention is to provide a well casing coupling assembly which can be used to permit cementing off and isolating a lower casing section, following the cementing operation, by removal of an upper casing section, which coupling assembly is constructed to minimize any interference with this operation as a result of setting up or accumulation of cement or cement particles within the bore through the coupling assembly.

Further objects and advantages will become apparent as the following detailed description of a preferred embodiment of the invention is read in conjunction with the accompanying drawings which illustrate such preferred embodiment.

BROAD DESCRIPTION OF THE DRAWINGS

FIG. 1 is a partially schematic, elevation view of a cased, off-shore oil well projecting from a barge at the surface to a location below the ocean floor, and incorporating the coupling assembly of the present invention.

FIG. 2 is a vertical sectional view through the coupling assembly of the present invention.

FIG. 3 is a sectional view taken along line 3—3 of FIG. 2.

DETAILED DESCRIPTION OF A PREFERRED EMBODIMENT OF THE INVENTION

Referring to FIG. 1 of the drawings, an off-shore oil well installation includes a floating barge or platform 10 having a derrick 12, thereon, and further including an upper portion 16 of a casing string extending from the barge to a wellhead installation designated generally by reference numeral 18. The wellhead installation 18 includes a base plate 20 resting on the sea floor in conventional fashion, and including the usual blowout preventers 22 and concomitant structure. The casing string further includes a portion 24 terminating in a casinghead 26 above the base plate 20 and projecting downwardly below the sea floor to the location of the coupling assembly 28 of the present invention. The coupling assembly 28 is employed for coupling the portion 24 of the casing string to the sections of well casing below there, and particularly to a casing section 30, as illustrated in FIG. 1.

The coupling assembly 28 is illustrated in detail in FIG. 2 of the drawings. The assembly includes a casing section 32 disposed on the lower end of the portion 24 of the casing string, the casing section 30 and an external coupling sleeve 34. The external coupling sleeve 34 has an open end which is slidably telescoped over the lower end of the casing section 32, and is welded thereto as shown at 36. The sleeve 34 has an open lower end 38 which is of enlarged diameter and the sleeve is characterized by an upset 40 positioned inwardly in spaced relation to the open lower end thereof. It will be noted that the open lower end portion of the sleeve 34 is telescoped over the upper end of the casing section 30, and limited in its downward movement in relation to this section 30, and limited in its downward movement in relation to this section of the casing by the upset 40 which cooperates with an enlargement formed on the casing section at this point.

Formed internally in the sleeve 34 at a location spaced axially above the upset 40, and below the open upper end of the casing section 30, is an annular, radially extending, axially facing shoulder 42. When the upset 40 bears against, and mates with, the enlargement in the casing section 30, the shoulder 42 is positioned adjacent a plurality of annular, V-shaped notches or grooves 44 which are defined by a pair of intersecting, inwardly inclined cuts in the external wall of the casing section 30, with each notch defining an angle of 90°.

An expandable locking element 46 in the form of a split ring having radially inwardly projecting teeth of triangular cross-section, and dimensioned to mate with the grooves or notches 44, extends around the upper end of the casing section 30, with the teeth thereof in interlocking engagement with the notches in the outer periphery of the casing section. The expandable locking element 46 is axially split to permit expansion in a radial direction as the ends of the element adjacent the split are opened apart from each other. In the illustrated interlocking status of the coupling assembly of the invention, the expandable locking element 46 is constricted radially to effect the engagement of the teeth thereof with the notches 44 by an external tubular collar hereinafter described. The lower end of the expandable locking element 46 bears against the shoulder 42. The radially outer periphery of the locking element is tapered from one end of the locking element to the other so that the radially thicker portion of the locking element is at the lower side thereof, and the thinner portion of the locking element is at the upper side thereof. At its upper end, the locking element 46 has a beveled surface 46a which projects upwardly and inwardly from the radially outer side of the locking element.

An internal tubular collar 52 is slidably positioned within the external coupling sleeve and includes a beveled upper end surface 54 which terminates at a relatively sharp edge 54a at the radially outer side of the upper end of the internal tubular collar. At its lower end, the internal tubular collar 52 carries an annular locking ring 56 which has a beveled radially inner surface 56a thereon which is geometrically configured to mate with the beveled outer side of the expandable locking element 46. The locking ring 56a is also provided at its lower end with a downwardly and outwardly beveled surface 56b. The annular locking ring 56 projects into the annulus between the expandable locking element 46 and the internal wall of the external coupling sleeve 34 to retain the expandable locking element in its constricted, casing-engaging position, as shown in FIG. 2 of the drawings. An axially facing, radially extending shoulder 58 is at the axially inner end of the annular locking ring 56, and bears against the upper end face of the casing section 30 when the external tubular collar 52 is in the illustrated position.

For the purpose of retaining the internal tubular collar in the position illustrated in FIG. 2, in which the upper and lower parts of the casing string are interlocked and placed in communication through the coupling assembly of the invention, a shear pin 60 is extended through aligned apertures formed through the wall of the internal tubular collar and in the wall of the external coupling sleeve 52. The shear pin 60 thus interlocks the internal tubular collar to the external coupling sleeve and prevents sliding movement of the internal collar in an axial direction. A closure plug 62 is screwed into a threaded counterbore at the radially inner end of the shear pin aperture through the body of the internal tubular collar 52 to retain the shear pin 60 in its interlocking position. In this regard, it is pointed out that prior to makeup of the coupling assembly of the present invention, and for a purpose which will be more fully understood as the subsequent description of the invention proceeds, the apertures which accommodate the pivot pin 60 are left open, and the plug 62 is removed. A grease zerk, such as that shown in dashed lines in FIG. 2 and designated by reference number 64, is then screwed into the threaded counterbore at that time, and the aperture through the tubular collar 52 is employed for introducing a lubricant between the internal tubular collar and the external coupling sleeve. In this way, the internal tubular collar 52 will slide easily within the external coupling sleeve at a subsequent time during the operation of the coupling assembly when it is desired to disengage the casing section 32 from the casing section 30 by disengaging actuation of the coupling assembly in the manner hereinafter described. It is after such lubrication has been effected that the shear pin 60 is inserted in its illustrated position, and the plug 62 then threaded into the counterbore to secure the shear pin in an operative position.

An annular pulling tool-engaging 68 is formed around a medial portion of the internal wall of the internal tubular collar 52 to facilitate engagement by a tool used to actuate the coupling assembly to release the casing sections 30 and 32 from engagement with each other. It should also be noted that the mechanism of the coupling assembly, and particularly, the expandable locking element 46, is protected from corrosive contacts with fluids moved axially within the casing string during operation of the well, or during subsequent cementing in the well, by means of a plurality of O-ring seals. Thus, an O-ring seal 70 extends around the upper end of the internal tubular collar 52 and seals between the collar and the external coupling sleeve. Similarly, an O-ring seal 72 is provided between the upper end of the casing section 30 and the internal tubular collar 52 at a location above the expandable locking element. The O-rings 70 and 72 function to provide seals preventing the ingress or infiltration of well fluids between the internal collar 52 and the external coupling sleeve 34 and also function to protect the annular locking ring 56 and the expandble locking element 46 from contact with well fluids moving in the bore through the casing string. Similarly, a pair of O-ring seals 74 and 76 are provided adjacent the lower end 38 of the external coupling sleeve 30 and prevent infiltration or seepage of any external fluids, such as sea water, between the casing and the coupling sleeve, and ultimately to the location of ring 56 so as to corrode, and interfere with the functioning of, ring 56 so as to corrode, and interfere with the functioning of, these structural elements.

In the use and operation of the coupling assembly of the invention, the assembly is initially made up by first lubricating the contiguous wall of the internal tubular collar 52 and external coupling sleeve 34 through a grease zerk 64 threaded into the counterbone in the internal wall of the collar in the manner previously described. The collar 52 is then slid axially upwardly in the external coupling sleeve 34 to a point such that the lower end or tip of the annular locking ring 56 just engages the outer wall of the expandable locking element 46 at the upper end thereof where the expandable locking element is radially thinnest. In this status, the expandable locking element can expand sufficiently to permit it to pass by the grooves or notches 44 formed in the upper end portion of the casing section 30.

The external coupling sleeve 34, carrying the internal tubular collar and expandable locking element in the described status, is then telescoped over the upper end of the casing section 30 until the upset 40 engages the enlargement on the casing 30, and the expandable locking element 46 is positioned opposite, but radially outwardly of the notches or grooves 44. The internal tubular collar 52 is then forced axially downwardly within the external coupling sleeve 34 so as to constrictively compress the expandable locking element radially inwardly and effect an interlocking engagement between the teeth of the locking element and the notches or grooves 44. A shear pin 60 is then inserted into the passageways in the internal tubular collar 52 and the external coupling sleeve 34 (the grease zerk 64 has previously been removed) and after seating of the shear pin, the plug 62 is threaded into position with a suitable allen wrench or the like. The casing section 32 is then positioned with its lower end telescoped inside the external coupling sleeve 34 in the manner illustrated, and is welded in this position. The assembly is then ready for lowering into position for coupling of the casing section 30 with another casing section (not illustrated) disposed therebelow.

As an alternate mode of assembling the coupling assembly, the casing section 32 may, in some instances, be guided into the upper end of the sleeve 34 after the remaining portions of the coupling assembly have been placed in the well bore and connected to the casing string therebelow. After the telescoping relationship between the casing section 32 and the coupling sleeve 34 is achieved, an effective interlock and seal between these two members can be effected in various ways known to the art.

When the coupling assembly of the invention is to be utilized for quickly disconnecting the casing section 32 and the casing string therabove from the casing section 30, such as at a time when it is desired to cement in the well and remove all debris or equipment from the sea floor, a pulling tool is initially run into the casing string to a location opposite the internal tubular collar 52. Suitable pulling tools can include, for example, a Bowen spear, or any other device which includes an expandable, radially projectable element which can be made to interfit and interlock with the annular channel 68 in the internal tubular collar.

When such engagement has been effected, a pull is exerted on the retrieving tool at the surface to apply an upward force to the internal tubular collar 52. This results in the shearing of the shear pin 60, facilitating upward movement of the collar within the coupling sleeve 34. The collar 52 is free to move axially within the sleeve 34 until the upper end of the collar abuts the lower end of the casing section 32. The beveled surface 54 at the upper end of the collar 52 and the relatively sharp edge 54a formed on the upper end of the collar facilitate the wedging out of any accumulations or accretions of cement which may have built up on the inside wall of the sleeve 34 and between the collar 52 and the casing section 32. Thus, such accumulations are prevented from blocking or impeding the upward sliding movement of the collar 52.

When the collar 52 has moved upwardly a distance slightly greater than the axial dimension of the expandable locking element 46, the split ring construction of this locking element permits it to spring outwardly to an enlarged diameter such that the teeth carried at the radially inner side thereof are free from contact or engagement with the notches or grooves 44. At this point, positive interlocking engagement between the locking element and the upper end of the casing section 30 no longer exists. Continued upward pull on the retrieving tool brings the collar 52 into contact with the lower end of the casing section 32. From this point, continued retrieval of the tool which is interlocked with the collar 52 will concurrently effect retrieval of that portion of the casing string which is disposed above the couping assembly.

It will be noted that when the disconnection of the casing sections joined by the coupling assembly is effected in the manner described, retrieval of the upper portion of the string effectively recovers, with the upper casing sections, the entire mechanism of the coupling assembly. Thus, once the annular locking ring 56 at the lower end of the internal tubular collar 52 has cleared the expandable locking element 46, this element expands or springs outwardly to clear the teeth 44, but in so doing, continues to rest upon the axially facing shoulder 42 formed inside the coupling sleeve 34. Thus, the upper portion of the casing string is brought out of the well and to the surface or drilling platform 10 along with the coupling sleeve 34, the internal tubular collar 52 and the expandable locking element 46, all of which can be reutilized a number of times in different well installations without the need for replacement or repair of any structural element of the assembly.

From the foregoing description of the invention, it will be apparent that the invention provides a simple, mechanically reliable and economically useable coupling assembly for coupling spaced, aligned casing or tubing sections in a down-hole or submarine environment. Although a preferred embodiment of the invention has been herein described in order to illustrate the basic principles which underlie the invention, it will be understood that various changes and innovations can be effected in the described preferred embodiment without departure from such basic principles. Changes and innovations of this type are therefore deemed to be circumscribed by the spirit and scope of the invention except as the same may be necessarily limited by the appended claims, or reasonable equivalents thereof.

What is claimed is:

1. A coupling assembly for coupling spaced aligned casing sections together comprising:
    an external coupling sleeve having a first open end adapted to telescopingly engage an open end of a first casing section, and having a second open end adapted to telescope over an open end portion of a second casing section, said coupling sleeve further including annular shoulder means spaced inwardly from the second open end thereof;
    an internal tubular collar slidably positioned in said external coupling sleeve and including:
        an annular locking ring forming an end of said tubular collar bearing against said annular shoulder and movable as a part of the tubular collar with the remainder of the tubular collar; and
        engaging means for engaging a tool extended through the first casing section into the internal collar to facilitate sliding said collar in said coupling sleeve away from said annular shoulder when said tool is pulled toward the first casing section;
    an expandable locking element constrictively positioned within said annular locking ring, bearing against said annular shoulder, and adapted to interlock with the outer surface of said second casing section; and
    a shearable element interconnecting said sleeve and internal tubular collar, and adapted to shear when said collar is slidably urged upwardly toward said first open end of said coupling sleeve to a position free of said locking element.

2. A coupling assembly as defined in claim 1 wherein said expandable locking element comprises a split band having radially inwardly projecting teeth on the radially inner side thereof, and including an axially beveled radially outer surface extending between a first end of said band bearing against said shoulder and a second end of said band of lesser radial thickness than said first end of said band.

3. A coupling assembly as defined in claim 1 wherein said coupling sleeve includes a diametric constriction in the bore thereof between said second open end thereof and said shoulder adapted for limiting the distance said sleeve can telescope over said second casing section.

4. A coupling assembly as defined in claim 1 wherein said engaging means comprises an annular groove in the internal wall of said collar between the opposite ends thereof.

5. A coupling assembly as defined in claim 1 wherein said shearable element comprises a shear pin extending into aligned pin holes in said collar and coupling sleeve.

6. A coupling assembly as defined in claim 2 wherein said coupling sleeve includes a diametric constriction of the bore thereof between said second open end thereof and said shoulder adapted for limiting the distance said sleeve can telescope over said second casing section.

7. A coupling assembly as defined in claim 6 wherein said engaging means comprises an annular groove in the internal wall of said collar between the opposite ends thereof.

8. A coupling assembly as defined in claim 7 wherein said shearable element comprises a shear pin extending into aligned pin holes in said collar and said coupling sleeve.

9. A coupling assembly as defined in claim 8 wherein:
said first open end of the coupling sleeve passes outside of, and around, the open end of said first casing section; and
said internal tubular collar has a beveled end opposite its end carrying said annular locking ring means for cooperating with said end of said first casing section for excluding accumulations of cement from therebetween when said collar is moved toward said first casing section.

10. An oil and gas well comprising:
a vertically extending casing string including an upper portion having a first casing section at the lower end thereof, and a lower portion having a second casing section at the upper end thereof, said second casing section having an enlargement around the outer side thereof;
a tubular sleeve having an upper end telescoped over and secured around said first casing section, and depending from said first casing section and including an upset lower end of enlarged diameter secured over the open upper end of said second casing section, said tubular sleeve further including an axially facing, radially extending shoulder projecting radially outwardly from the external wall of said second casing;
a radially expandable, annular locking element extending around, and engaging at the inner periphery thereof, the upper end of said second casing section;
means around said locking element restricting it, by compression, to a relatively small diameter, and vertically movable in said tubular sleeve from said shoulder to the lower end of said first casing section to a position free of said locking element; and
means releasably securing said locking element restricting means against said shoulder.

* * * * *

UNITED STATES PATENT OFFICE
CERTIFICATE OF CORRECTION

Patent No. 4,073,511　　　　　　　　Dated February 14, 1978

Inventor(s) Billie G. Haas & Carol B. Haas

It is certified that error appears in the above-identified patent and that said Letters Patent are hereby corrected as shown below:

Col. 4, line 28, delete "30, and limited in its downward movement in relation to this section" ;

Col. 5, line 55, before "68" insert --channel-- ;
Col. 6, line 14, delete "so as to" ;
Col. 6, delete line 15 in its entirety;
Col. 6, line 20, change "wall" to --walls-- ;
Col. 6, line 22, change "counterbone" to --counterbore-- ;
Col. 7, line 41, change "couping" to --coupling-- ;
Col. 10, line 1, after "having an" insert --open-- ;
Col. 10, line 5, delete "open" .

Signed and Sealed this

Eleventh Day of July 1978

[SEAL]

Attest:

RUTH C. MASON
Attesting Officer

DONALD W. BANNER
Commissioner of Patents and Trademarks